(12) United States Patent
Nakano et al.

(10) Patent No.: US 12,115,480 B2
(45) Date of Patent: Oct. 15, 2024

(54) PARTICLE ADHESION DEVICE, METHOD FOR PRODUCING FILTER, AND PILLAR SHAPED HONEYCOMB FILTER

(71) Applicant: NGK INSULATORS, LTD., Nagoya (JP)

(72) Inventors: Seiya Nakano, Nagoya (JP); Yuichi Tajima, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/822,153

(22) Filed: Aug. 25, 2022

(65) Prior Publication Data

US 2023/0131763 A1 Apr. 27, 2023

Related U.S. Application Data

(63) Continuation of application No. PCT/JP2022/007709, filed on Feb. 24, 2022.

(30) Foreign Application Priority Data

Oct. 26, 2021 (JP) .................................. 2021-174985

(51) Int. Cl.
*B01D 46/00* (2022.01)
*B01D 46/24* (2006.01)

(52) U.S. Cl.
CPC ..... *B01D 46/0001* (2013.01); *B01D 46/2474* (2013.01); *B01D 46/2482* (2021.08); *B01D 46/249* (2021.08); *B01D 2279/30* (2013.01)

(58) Field of Classification Search
CPC ............ B01D 46/0001; B01D 46/2482; B01D 46/249; B01D 46/2474; B01D 2279/30;
(Continued)

(56) References Cited

U.S. PATENT DOCUMENTS

2011/0229634 A1* 9/2011 Tsuji ....................... C04B 41/87
427/181
2011/0229635 A1 9/2011 Tsuji et al.
(Continued)

FOREIGN PATENT DOCUMENTS

JP 2011-212671 A 10/2011
JP 2012-075989 A 4/2012
(Continued)

OTHER PUBLICATIONS

Japanese Publication No. 2011-212671 A corresponds to U.S. Patent Publication No. 2011/0229635 A1.
(Continued)

*Primary Examiner* — Robert A Hopkins
*Assistant Examiner* — Qianping He
(74) *Attorney, Agent, or Firm* — BURR PATENT LAW, PLLC

(57) ABSTRACT

A particle adhesion device includes: a holder; a chamber; a nozzle; an intake port; and a flow control member. The holder holds a filter substrate having a first end face and a second end face. The chamber is in communication with the holder and is arranged so that the first end face of the filter substrate faces a space in the chamber. The nozzle is arranged on an opposite surface of the chamber opposing to the first end face of the filter substrate, and can inject an aerosol containing particles toward the first end face of the filter substrate. The intake port is provided on the opposite surface of the chamber and can incorporate an ambient gas. The flow control member is arranged on the opposite surface provided with the intake port, and can control the flow of the ambient gas.

12 Claims, 10 Drawing Sheets

(58) Field of Classification Search
CPC ... B01D 2401/32; C01B 41/009; C01B 41/87; C01B 41/4545; C01B 2111/00793; B05D 7/22; B05D 2401/32; B01J 37/0232; F24F 7/007; F01N 2330/04; F01N 2330/06; F01N 2330/30; F01N 2510/068
USPC .................. 55/523, 418, 422, DIG. 30, 419; 422/217; 60/311
See application file for complete search history.

(56) References Cited

U.S. PATENT DOCUMENTS

| | | | |
|---|---|---|---|
| 2015/0037220 A1* | 2/2015 | Goto | B01D 46/24491 422/171 |
| 2021/0299603 A1* | 9/2021 | Sendo | B01D 39/2079 |

FOREIGN PATENT DOCUMENTS

| | | |
|---|---|---|
| JP | 5597148 B2 | 10/2014 |
| JP | 2021-154272 A | 10/2021 |
| JP | 6979541 B1 | 12/2021 |
| KR | 100770181 B1 * | 10/2007 |

OTHER PUBLICATIONS

Japanese Publication No. 2021-154272 A corresponds to U.S. Patent Publication No. 2021/0299603 A1.
Japanese Patent No. 5597148 B2 is discussed at paragraph [0005] of the present specification and corresponds to U.S. Patent No. 2011/0229634 A1.
International Search Report dated May 17, 2022 (Application No. PCT/JP2022/007709).
English translation of the International Preliminary Report on Patentability (Chapter I) dated Apr. 30, 2024 (Application No. PCT/JP2022/007709).

* cited by examiner

FIG. 7

PARTICLE ADHESION DEVICE, METHOD FOR PRODUCING FILTER, AND PILLAR SHAPED HONEYCOMB FILTER

FIELD OF THE INVENTION

The present invention relates to a particle adhesion device, a method for producing a filter, and a pillar shaped honeycomb filter.

BACKGROUND OF THE INVENTION

Particulate matters (hereinafter referred to as PMs: Particulate Matters) such as soot are contained in an exhaust gas discharged from an internal combustion engine such as diesel engines and gasoline engines. The soot is harmful to the human body and emission of the soot is regulated. Currently, filters represented by DPFs and GPFs for passing an exhaust gas through a small porous partition wall to filter the PMs such as soot, are widely used in order to comply with exhaust gas regulations.

Known as a filter for collecting the PMs is a wall flow type pillar shaped honeycomb structure filter including: a plurality of first cells extending from a first end face to a second end face, the first end face being opened and the second end face having plugged portions; and second cells each extending from the first end face to the second end face, the second end face being opened and the first end face having plugged portions, wherein each of the first cells and each of the second cells are arranged to be adjacent to each other across a porous partition wall.

In recent years, with tightening of exhaust gas regulations, stricter PM emission standards (PN regulation: Particle Matter Number Regulation) have been introduced, and higher PM collection performance (higher PN collection efficiency) is required for filters. Therefore, it is known to form a layer for collecting PMs (hereinafter referred to as a "collection layer") on the surface of the porous partition wall forming the cells.

As a device for forming the collecting layer, a device is proposed which includes: a workpiece fixing portion for fixing a substrate of the honeycomb filter (hereinafter, abbreviated as "honeycomb substrate"); a powder carrying portion for carrying powder (also referred to as "particles") riding on an air flow (also referred to as a "fluid") using a pressurized gas, wherein the powder carrying portion is arranged on one side of the workpiece fixing portion; an introduction portion that is a non-closed space arranged between the powder carrying portion and the workpiece fixing portion, wherein the introduction portion further mixes the powder carried by the air flow from the powder carrying portion with other gas and introduces the mixture to the honeycomb substrate fixed to the workpiece fixing portion; and a suction portion arranged on the other side of the workpiece fixing portion, wherein the suction portion sucks the gas that has passed through the honeycomb substrate fixed to the workpiece fixing portion by reducing the pressure on the other side of the workpiece fixing portion with respect to one side of the workpiece fixing portion using a suction means (Patent Literature 1). According to the device, the gas that has passed through the honeycomb substrate is sucked by the suction means, so that the air flow is rectified. Patent Literature 1 mentions that by introducing the powder into the rectified air flow to form a solid-gas two-phase flow, the powder can be uniformly and stably introduced to the honeycomb substrate, so that a collection layer having a uniform thickness can be formed.

PRIOR ART

Patent Literature

[Patent Literature 1] Japanese Patent No. 5,597,148 B

SUMMARY OF THE INVENTION

The present invention relates to a particle adhesion device, comprising:
 a holder for holding a filter substrate, the filter substrate having a first end face in which a fluid can flow and a second end face from which the fluid can flow out;
 a chamber in communication with the holder, the chamber being arranged so that the first end face of the filter substrate faces a space in the chamber;
 a nozzle arranged on an opposite surface of the chamber opposing to the first end face of the filter substrate, the nozzle being capable of injecting an aerosol containing particles toward the first end face of the filter substrate;
 an intake port provided on the opposite surface of the chamber, the intake port being capable of incorporating an ambient gas; and
 a flow control member arranged on the opposite surface provided with the intake port, the flow control member being capable of controlling the flow of the ambient gas.

Further, the present invention relates to a method for producing a filter using the particle adhesion device as described above.

Furthermore, the present invention relates to a pillar shaped honeycomb structure filter, comprising:
 a pillar shaped honeycomb substrate comprising: a plurality of first cells each extending from a first end face to a second end face, the first end face being opened and the second end face having plugged portions; and a plurality of second cells each extending from the first end face to the second end face, the second end face being opened and the first end face having plugged portions, wherein each of the first cells and each of the second cells are arranged to be adjacent to each other across a porous partition wall; and
 a collection layer formed on a surface of at least one of the first cells and the second cells,
 wherein a difference between thicknesses of the collection layer is 15 μm or less.

BRIEF DESCRIPTION OF THE DRAWINGS

FIG. 7 is a view schematically showing a specific example of an aerosol generator;

DETAILED DESCRIPTION OF THE INVENTION

Figure 1:
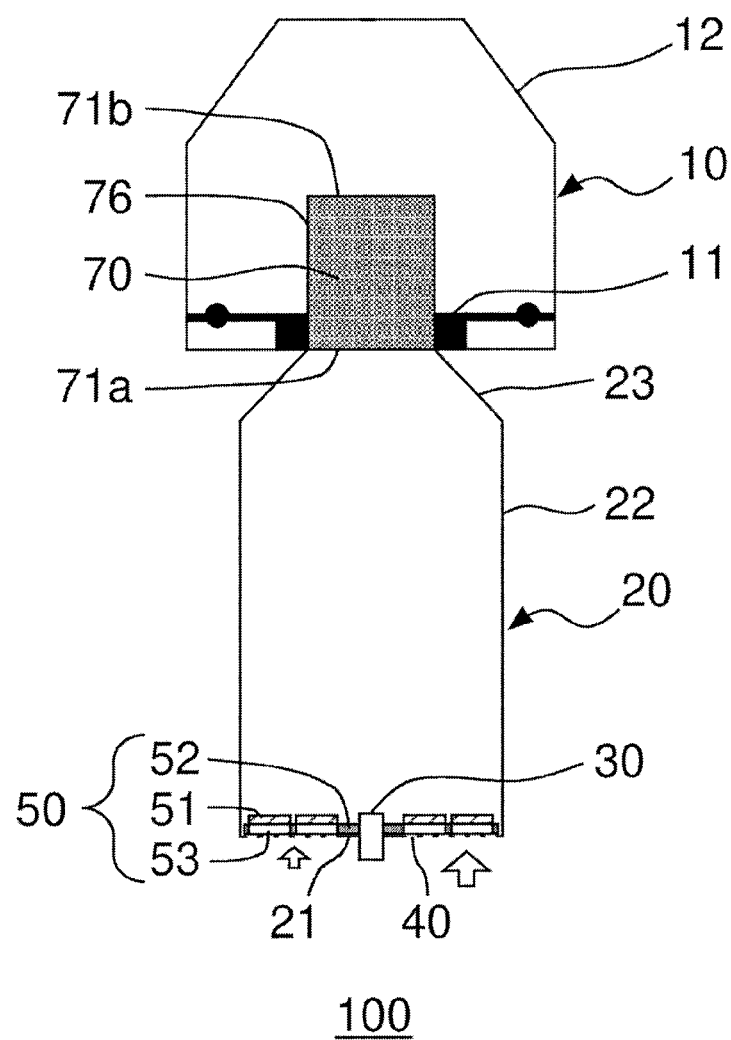
FIG. 1 is a schematic view of a particle adhesive device according to an embodiment of the present invention.

Although the device described in Patent Literature 1 is mainly suitable for forming a collection layer on a honeycomb substrate having a smaller diameter (for example, a diameter of less than 140 mm), formation of a collection layer having a larger diameter (for example, a diameter of less than 180 mm) on the honeycomb substrate tends to result in a non-uniform thickness of the collection layer. Specifically, in a cross section of the honeycomb substrate orthogonal to a flow direction of the fluid, a collecting layer having a larger thickness is formed around the central portion of the honeycomb substrate, while a collecting layer having a smaller thickness tends to be formed near the outer peripheral portion of the honeycomb substrate. The reason would be that the particles are fed to the honeycomb substrate before they are sufficiently diffused to the vicinity of the outer peripheral portion in the cross section orthogonal to the flow direction of the fluid.

Although Patent Literature 1 presupposes that the collection layer is formed on the honeycomb substrate, any filter substrate other than the honeycomb substrate also has a problem that it is difficult to form a collection layer having a uniform thickness depending on the size.

The present invention has been made to solve the above problems. An object of the present invention is to provide a particle adhesion device and a method for producing a filter, which can form a collection layer having a uniform thickness regardless of the type and size of the filter substrate.

Another object of the present invention is to provide a pillar shaped honeycomb structure filter including a collection layer having a uniform thickness.

As a result of intensive studies for the structure of the particle adhesion device in order to solve the above problems, the present inventors have found that a flow control member capable of controlling the flow of an ambient gas is provided at a specific position, whereby a swirling flow can be generated in a fluid in a chamber to promote the diffusion of particles, and have completed the present invention.

According to the present invention, it is possible to provide a particle adhesion device and a method for producing a filter, which can form a collection layer having a uniform thickness regardless of the type and size of the filter substrate.

Also, according to the present invention, it is possible to provide a pillar shaped honeycomb structure filter including a collection layer having a uniform thickness.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

(1) Particle Adhesion Device

FIG. 1 is a schematic view of a particle adhesion device according to an embodiment of the present invention.

As shown in FIG. 1, a particle adhesion device 100 includes: a holder 10; a chamber 20; a nozzle 30; an intake port 40; and a flow control member 50. The holder 10 holds a filter substrate 70 having a first end face 71a in which a fluid can flow and a second end face 71b from which a fluid can flow out. The chamber 20 is in communication with the holder 10 and is arranged so that the first end face 71a of the filter substrate 70 faces a space in the chamber 20. The nozzle 30 is arranged on an opposite surface 21 of the chamber 20 opposing to the first end face 71a of the filter substrate 70, and can inject an aerosol containing particles toward the first end face 71a of the filter substrate 70. The intake port 40 is provided on the opposite surface 21 of the chamber 20 and can incorporate an ambient gas. The flow control member 50 is arranged on the opposite surface 21 provided with the intake port 40, and can control the flow of the ambient gas. By such a structure, the flow control member 50 can control the flow of the ambient gas to generate a swirling flow in the fluid in the chamber 20, thereby promoting the diffusion of particles in the fluid (aerosol) in the chamber 20. As a result, in a cross section orthogonal to the flow direction of the fluid, a difference in diffused amount of the particles between the central region and the outer peripheral region is decreased, so that a collection layer having a uniform thickness can be formed.

Hereinafter, the filter substrate 70 on which the collection layer is formed, and each component of the particle adhesion device 100 will be described in detail.

<Filter Substrate>

The filter substrate 70 is not particularly limited as long as it has the first end face 71a in which the fluid can flow and the second end face 71b from which the fluid can flow out, and it may employ various shapes. For example, the filter substrate 70 may be a wall flow type pillar shaped honeycomb substrate. The pillar shaped honeycomb structure filter produced using the wall flow type pillar shaped honeycomb substrate can be used as DPF and GPF for collecting PMs such as soot, which are attached to an exhaust gas line from a combustion device, typically an engine mounted on a vehicle.

Figure 2:
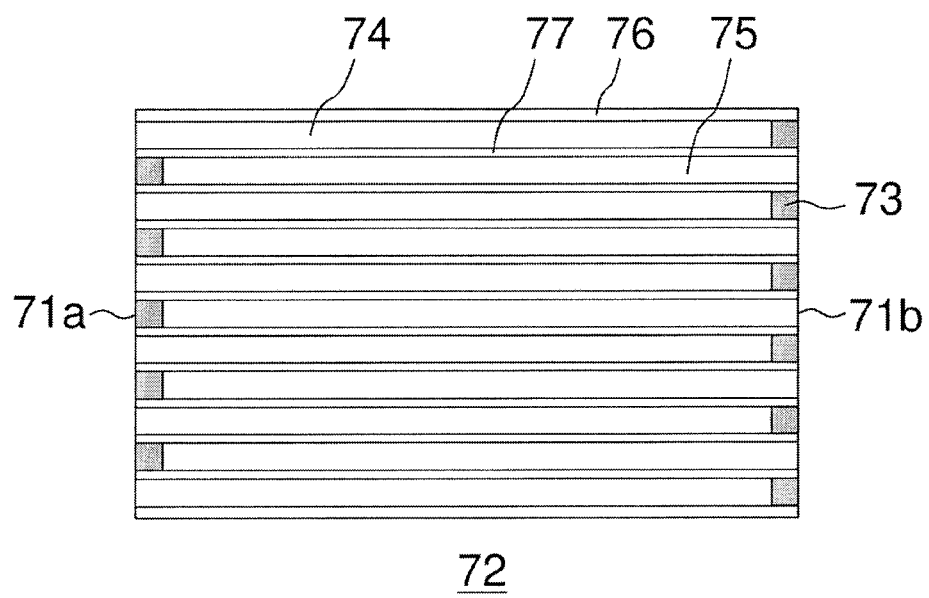
FIG. 2 is a schematic cross-sectional view of a pillar shaped honeycomb substrate for use in a particle adhesive device according to an embodiment of the present invention.
Figure 3:
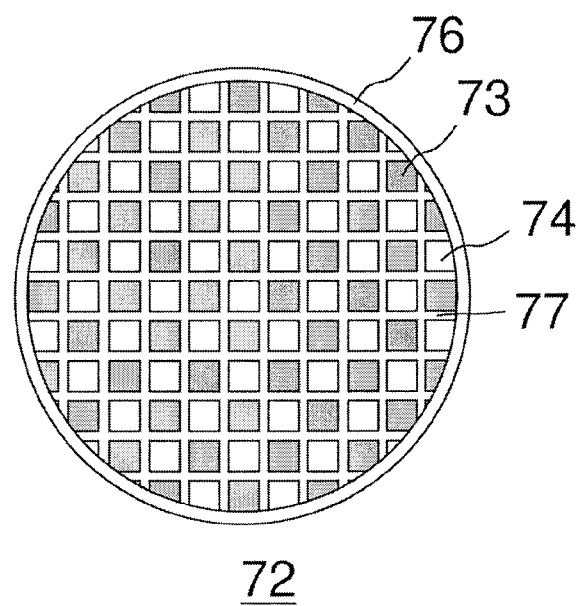
FIG. 3 is a schematic end view of the pillar shaped honeycomb substrate of FIG. 2.

Here, FIGS. 2 and 3 are a schematic cross-sectional view (cross-sectional view parallel to an extending direction of cells) and an end view (end view of a first end face) of the wall flow type pillar shaped honeycomb filter, respectively.

As shown in FIGS. 2 and 3, the pillar shaped honeycomb substrate 72 includes: a plurality of first cells 74 each extending from a first end face 71a to a second end face 71b, the first end face 71a being opened and the second end face 71b having plugged portions 73; and a plurality of second cells 75 each extending from the first end face 71a to the second end face 71b, the second end face 71b being opened and the first end face 71a having the plugged portions 73. The honeycomb substrate 70 further includes: an outer peripheral wall 76 on outer sides of the first cells 74 and the second cells 75; and a porous partition wall 75 between the first cell 74 and the second cell 75. Each of the first cells 74 and each of the second cells 75 are alternately arranged to be adjacent to each other across the porous partition wall 77, whereby each of the first end face 71a and the second end face 71b presents a honeycomb shape.

The size of the pillar shaped honeycomb substrate 72 is not particularly limited, but the pillar shaped honeycomb substrate 72 can have a diameter of 180 mm or more in a cross section orthogonal to the extending direction of the first cells 74 and the second cells 75. For the pillar shaped honeycomb substrate 72 having a diameter of 180 mm or more, it was difficult to form a collection layer having a uniform thickness by using the conventional collection layer forming device, whereas it is possible to form a collection layer having a uniform thickness by using the particle adhesion device 100.

As used herein, the "diameter" means the equivalent circle diameter when the cross section of the pillar shaped honeycomb substrate 72 is not circular.

Non-limiting Examples of materials for forming the pillar shaped honeycomb substrate 72 include porous ceramics. The ceramics includes cordierite, mullite, zirconium phosphate, aluminum titanate, silicon carbide, silicon-silicon carbide composites (e.g., Si-bonded SiC), cordierite-silicon carbide composites, zirconia, spinel, indialite, sapphirine, corundum, titania, silicon nitride and the like. These ceramics may be used alone or in combination of two or more kinds.

Examples of shapes of the end faces of the pillar shaped honeycomb substrate 72 include, but not limited to, round shapes such as a circular shape, an oval shape, a race track shape and an elliptical shape, and polygonal shapes such as a triangular shape and a quadrangular shape. It should be noted that the illustrated pillar shaped honeycomb substrate 72 is an example in the case where the shapes of the end faces are circular.

Examples of shapes of the cells (the first cells 74 and the second cells 75) in the cross section perpendicular to the extending direction of the cells include, but not limited to, preferably a quadrangle, a hexagon, an octagon, or a combination thereof. Among them, the quadrangle (in particular, square) and hexagon are preferred. Such a cell shape results in a decreased pressure loss when the fluid is allowed to flow through the pillar shaped honeycomb structure filter.

The upper limit of the average thickness of the porous partition walls 77 is preferably 0.238 mm or less, and more preferably 0.228 mm or less, and still more preferably 0.220 mm or less, in terms of suppressing the pressure loss. However, the lower limit of the average thickness of the porous partition walls 77 is preferably 0.194 mm or more, and more preferably 0.204 mm or more, and still more preferably 0.212 mm or more, in terms of ensuring the strength of the pillar shaped honeycomb substrate 72.

The thickness of the porous partition wall 77 refers to a length in which a line segment crosses the partition wall when the centers of gravity of adjacent cells are connected by the line segment in the cross section orthogonal to the extending direction of the cells (first cells 74, second cells 75). The average thickness of the porous partition walls 77 refers to an average value of the thicknesses of all the porous partition walls 77.

A cell density (the number of cells per unit cross-sectional area) of the pillar shaped honeycomb substrate 72 is not particularly limited, and it may be, for example, from 6 to 2000 cells/square inch (from 0.9 to 311 cells/cm$^2$), and more preferably from 50 to 1000 cells/square inch (from 7.8 to 155 cells/cm$^2$), and even more preferably from 100 to 400 cells/square inch (from 15.5 to 62.0 cells/cm$^2$).

The pillar shaped honeycomb substrate 72 can also be provided as an integrally formed product. The pillar shaped honeycomb substrate 72 can also be provided as a segment joined body by joining and integrating outer side surfaces of a plurality of pillar shaped honeycomb segments each having the outer peripheral wall. By providing the pillar shaped honeycomb substrate 72 as the segment joined body, thermal shock resistance can be increased.

The pillar shaped honeycomb substrate 72 can be produced using a method known in the art. The method for producing the pillar shaped honeycomb substrate 72 is described below as an example.

First, a raw material composition containing a ceramic raw material, a dispersion medium, a pore former and a binder is kneaded to form a green body. The green body is then extruded to form a desired pillar shaped honeycomb formed body. The raw material composition may optionally contain any additive such as a dispersant. In extrusion molding, a die having a desired overall shape, cell shape, partition wall thickness, cell density and the like can be used.

After the pillar shaped honeycomb formed body is dried, plugged portions are formed at predetermined positions on both end faces of the pillar shaped honeycomb formed body, and the plugged portions are then dried to obtain a pillar shaped honeycomb formed body having the plugged portions. After that, the pillar shaped honeycomb formed body is subjected to degreasing and firing to obtain a pillar shaped honeycomb structure (pillar shaped honeycomb substrate 72).

The ceramic raw material is a raw material for a portion that will remain after firing and form the skeleton of the pillar shaped honeycomb structure as ceramics. The ceramic raw material that can be used herein includes a raw material capable of forming the above ceramics after firing. The ceramic raw material can be provided, for example, in the form of powder. Examples of the ceramic raw material include raw materials that can obtain ceramics such as cordierite, mullite, zircon, aluminum titanate, silicon carbide, silicon nitride, zirconia, spinel, indialite, sapphirine, corundum, and titania. Specific examples of such raw materials include, but not limited to, silica, talc, alumina, kaolin, serpentine, pyrophyllite, brucite, boehmite, mullite, magnesite, and aluminum hydroxide. The ceramic raw material may be used alone or in combination of two or more types.

When the pillar shaped honeycomb structure filter is used for DPFs, GPFs and the like, cordierite can be preferably used as the ceramic. In this case, a cordierite-forming raw material can be used as the ceramic raw material. The cordierite-forming raw material is a raw material that will form cordierite by firing. The cordierite-forming raw material preferably has a chemical composition having 30 to 45% by mass of alumina ($Al_2O_3$) (including an amount of aluminum hydroxide converted to alumina), 11 to 17% by mass of magnesia (MgO), and 42 to 57% by mass of silica ($SiO_2$).

Examples of the dispersion medium include water or a mixed solvent of water and an organic solvent such as alcohol. The water can be more preferably used.

The pore former is not particularly limited as long as it forms pores after firing. Examples include wheat flour, starch, foaming resins, water-absorbing resins, porous silica, carbon (e.g., graphite), ceramic balloons, polyethylene, polystyrene, polypropylene, nylon, polyester, acrylics and phenols. The pore former may be used alone or in combination with two or more types. From the viewpoint of increasing the porosity of the fired body, the content of the pore former is preferably 0.5 parts by mass or more, and more preferably 2 parts by mass or more, and even more preferably 3 parts by mass or more, based on 100 parts by mass of the ceramic raw material. From the viewpoint of ensuring the strength of the fired body, the content of the pore former is preferably 10 parts by mass or less, and more preferably 7 parts by mass or less, and even more preferably 4 parts by mass or less, based on 100 parts by mass of the ceramic raw material.

Examples of the binder can include organic binders such as methyl cellulose, hydroxypropyl methyl cellulose, hydroxyethyl cellulose, carboxymethyl cellulose, and polyvinyl alcohol. In particular, it is preferable to use methyl cellulose in combination with hydroxypropyl methyl cellulose as the binder. Further, the content of the binder is preferably 4 parts by mass or more, and more preferably 5 parts by mass or more, and 6 parts by mass, based on 100 parts by mass of the ceramic raw material, in terms of increasing the strength of the honeycomb formed body. The content of the binder is preferably 9 parts by mass or less, and more preferably 8 parts by mass or less, and even more preferably 7 parts by mass or less, based on 100 parts by mass of the ceramic raw material, in terms of suppressing cracking due to abnormal heat generation in the firing step. The binder may be used alone or in combination with two or more types.

The dispersant that can be used includes ethylene glycol, dextrin, fatty acid soaps, polyether polyol and the like. The dispersant may be used alone or in combination with two or more types. The content of the dispersant is preferably from 0 to 2 parts by mass based on 100 parts by mass of the ceramic raw material.

The method for plugging the end faces of the pillar shaped honeycomb formed body is not particularly limited, and a known method can be employed. Materials of the plugged portions 73 are not particularly limited. Ceramics are preferable in terms of strength and heat resistance. The ceramics are preferably a ceramic material containing at least one selected from the group consisting of cordierite, mullite, zircon, aluminum titanate, silicon carbide, silicon nitride, zirconia, spinel, indialite, sapphirine, corundum, and titania. Even more preferably, the plugged portions 73 have the same material composition as that of a main body portion of the pillar shaped honeycomb formed body, because it can provide the same expansion coefficient during firing and lead to improved durability.

After drying the honeycomb formed body, degreasing and firing can be carried out to produce the pillar shaped honeycomb structure (pillar shaped honeycomb substrate 72). For conditions of the drying step, the degreasing step, and the firing step, known conditions may be used according to the material composition of the honeycomb formed body, and no specific explanation is required. However, specific examples of the conditions are given below.

In the drying step, conventionally known drying methods such as hot air drying, microwave drying, dielectric drying, drying under reduced pressure, vacuum drying, and freeze drying can be used. Among them, a drying method that combines the hot air drying and microwave drying or dielectric drying is preferable in that the entire pillar shaped honeycomb formed body can be quickly and uniformly dried.

When forming the plugged portions, it is preferable to form the plugged portions on both end faces of the dried pillar shaped honeycomb formed body and then dry the plugged portions. The plugged portions are formed at predetermined positions such that each of the first cells each extending from the first end face to the second end face, the first end face being opened and the second end face having the plugged portions, and each of the second cells each extending from the first end face to the second end face, the second end face being opened and the first end face having the plugged portions, are alternately arranged to be adjacent to each other across the porous partition wall.

Next, the degreasing step will be described. A combustion temperature of the binder is about 200° C., and a combustion temperature of the pore former is about from 300 to 1000° C. Therefore, the degreasing step may be carried out by heating the pillar shaped honeycomb formed body at a temperature in a range of from about 200 to 1000° C. A heating time is not particularly limited. It is generally about from 10 to 100 hours. The pillar shaped honeycomb formed body after the degreasing step is referred to as a calcined body.

Depending on the material composition of the pillar shaped honeycomb formed body, the firing step can be carried out, for example, by heating the calcined body to 1350 to 1600° C. and holding it for 3 to 10 hours. Thus, the pillar shaped honeycomb structure (pillar shaped honeycomb substrate 72) is produced which includes: the plurality of first cells 74 each extending from the first end face 71a to the second end face 71b, the first end face 71a being opened and the second end face 71b having the plugged portions 73; and the plurality of second cells 75 each extending from the first end face 71a to the second end face 71b, the second end face 71b being opened and the first end face 71a having the plugged portions 73, wherein each of the first cells 74 and each of the second cells 75 are alternately arranged to be adjacent to each other across the porous partition wall 77.

<Holder 10>

The holder 10 is a member for holding the filter substrate 70. The holder 10 is structured so that the first end face 71a of the filter substrate 70 can be held in an exposed state at a position facing the nozzle 30. In an embodiment, the holder 10 can have a chuck mechanism 11 for gripping the filter substrate 70 (for example, the outer peripheral wall 76 of the pillar shaped honeycomb substrate 72). Examples of the chuck mechanism 11 include, but not limited to, a balloon chuck. The holder 10 has a housing 12 for rectifying the aerosol that has passed through the filter substrate 70 in one direction, without being diffused.

Examples of the material used for the holder 10 include metals, ceramics, and the like. Examples of the metals include stainless steel, titanium alloys, copper alloys, aluminum alloys, brass and the like. The material of the holder 10 is preferably stainless steel because of its high durability and reliability.

<Chamber 20>

The chamber 20 is a tubular member such as cylindrical and rectangular cylindrical shapes. The chamber 20 is in communication with the holder 10 and is arranged so that the first end face 71a of the filter substrate 70 faces the space in the chamber 20.

The chamber 20 has a side wall 22 connected to the holder 10 and a surface (opposite surface 21) opposing to the first end face 71a of the filter substrate 70. The opposite surface 21 has an insertion port for the nozzle 30. With such a structure, the aerosol injected from the nozzle 30 can be directly introduced into the chamber 20.

Examples of the material used for the chamber 20 include metals, ceramics, and the like. Examples of the metals include stainless steel, titanium alloys, copper alloys, aluminum alloys, brass and the like. The material of the chamber 20 is preferably stainless steel because of its high durability and reliability.

The opposite surface 21 of the chamber 20 is provided with an intake port 40 capable of incorporating an ambient gas. By incorporating the ambient gas from the intake port 40 provided on the opposite surface 21, the ambient gas flows in the same direction as the flow direction of the aerosol injected from the nozzle 30, so that any disturbance to the aerosol can be eliminated to stabilize the aerosol.

The shape of the intake port 40 is not particularly limited, but it may be a round shape such as a circle, an ellipse, a race track shape and an oval shape, and a polygon such as a triangle or a quadrangle.

The size and number of the intake ports 40 may be appropriately set according to the size of the opposite surface 21, and are not particularly limited.

In an embodiment, as the opposite surface 21, a punching plate and/or a non-woven fabric can be used. Further, a filter may be installed on the outer surface of the opposite surface 21 in order to suppress the intake of agglomerated powder, debris of the filter substrate 70, dust and the like.

When a flow path cross-sectional area in the chamber 20 orthogonal to the flow direction of the aerosol is higher than that of the first end face 71*a* of the filter substrate 70, a tapered portion 23 may be formed on the downstream side of the side wall 22 such that the flow path cross-sectional area gradually decreases toward the first end face 71*a* of the filter substrate 70. It is preferable that the contour of the downstream end portion of the tapered portion 23 matches the outer peripheral contour of the first end face 71*a* of the filter substrate 70. With such a structure the particles are easily fed to the first end face 71*a* of the filter substrate 70.

A distance from the outlet of the nozzle 30 to the first end face 71*a* of the filter substrate 70 is preferably designed depending on the area of the first end face 71*a* of the filter substrate 70. Specifically, it is preferable that as the area of the first end face 71*a* of the filter substrate 70 is increased, the distance from the outlet of the nozzle 30 to the first end face 71*a* of the filter substrate 70 is increased, because the aerosol tends to spread uniformly in the direction orthogonal to the flow direction of the aerosol. In one embodiment, the distance from the outlet of the nozzle 30 to the first end face 71*a* of the filter substrate 70 can be 500 mm to 2000 mm.

<Nozzle 30>

The nozzle 30 is not particularly limited as long as it can inject the aerosol containing particles toward the first end face 71*a* of the filter substrate 70.

The nozzle 30 is preferably arranged at a position and in a direction where the aerosol is injected in a direction orthogonal to the first end face 71*a* of the filter substrate 70, and more preferably arranged at a position and in a direction where the aerosol is injected toward the central portion of the first end face 71*a* of the filter substrate 70.

In one embodiment, it is preferable that the nozzle 30 is provided at the central portion of the opposite surface 21 and a plurality of intake ports 40 are provided on the opposite surface 21 around the nozzle 30. Such a structure can enhance the effect of promoting the diffusion of particles in the aerosol mixed with the ambient gas in the chamber 20.

<Flow Control Member 50>

The flow control member 50 is a member which is arranged on the opposite surface 21 (an inner surface of the opposite surface 21) provided with the intake port 40 and which can control the flow of the ambient gas.

The flow control member 50 is not particularly limited as long as it has a structure where the flow of the ambient gas can be controlled, but it is preferable to have a plurality of blades 51 capable of controlling the flow of the ambient gas.

An inclination angle θ of the plurality of blades 51 with respect to the opposite surface 21 is not particularly limited, but it may preferably be 80° or less, and more preferably 70° or less, and still more preferably 60° or less. The controlling to such an inclination angle θ can allow a swirling flow to be generated in the ambient gas and to efficiently mix it with the aerosol injected from the nozzle 30, so that the diffusion of particles in the aerosol mixed with the ambient gas can be promoted. On the other hand, if the inclination angle θ is too low, the particles tend to adhere to the blades 51 and a loss of the raw material may increase. Therefore, the inclination angle θ is preferably 10° or more, and more preferably 15° or more, and further preferably 30° or more.

When the plurality of blades 51 are provided on the opposite surface 21 provided with the intake port 40, only the plurality of blades 51 may be provided, but from the viewpoint of ease of arrangement, a member having the plurality of blades 51 may be provided.

Here, FIG. 4 shows a schematic top view of the member having the plurality of blades 51. Further, FIG. 5 shows a schematic enlarged cross-sectional view (also showing the opposite surface 21) of the member in the circumferential direction.

As shown in FIGS. 4 and 5, it is preferable that the member having the plurality of blades 51 further includes a flat surface portion 52 parallel to the opposite surface 21; and a plurality of openings 53 which are provided on the flat surface portion 52 and exposes at least a part of the intake port 40, and each of the blades 51 is provided at a boundary between the flat surface portion 52 and the opening 53 and is inclined toward the opening 53 side. Further, it is preferable that each of the blades 51 has substantially the same shape as the outer edge shape of the opening 53. The member having such a shape can easily be manufactured by forming slits in portions that will be the openings 53 and the blades 51 (excluding the boundary between the flat surface portion 52 and the opening 53), and then pushing out the slit-formed portions.

In one embodiment, the plurality of blades 51 may be provided in two or more rows in the radial direction from the central portion of the opposite surface 21 to the outer peripheral portion. Such a structure can enhance the effect of generating the swirling flow in the ambient gas.

Examples of the material used for the flow control member 50 include metals, ceramics, and the like. Examples of the metals include stainless steel, titanium alloys, copper alloys, aluminum alloys, brass and the like. The material of the flow control member 50 is preferably stainless steel because of its high durability and reliability.

As shown in FIG. 6, the particle adhesion device 100 according to an embodiment of the present invention may further include an aerosol generator 60 connected to the nozzle 30. The means for connecting the nozzle 30 to the aerosol generator 60 is not particularly limited, but the nozzle 30 and the aerosol generator 60 can be connected via, for example, a connecting pipe 61. The use of the aerosol generator 60 can allow the aerosol to be stably fed to the nozzle 30.

The aerosol generator 60 is a device that injects particles together with a fluid (a driving gas). The type of the aerosol generator 60 is not particularly limited, and any aerosol generator known in the art may be used. For example, it is possible to use an aerosol generator 60 having a mechanism for sucking particles and discharging them together with the fluid utilizing a negative pressure generated by the fluid at the high velocity.

By using a compressed gas such as compressed air with controlled pressure as the fluid (driving gas), the injection flow rate of the aerosol from the nozzle 30 can be controlled. Further, as the driving gas, dry air (which has, for example, a dew point of 10° C. or less) is preferably used in order to suppress the aggregation of particles.

The aerosol generator 60 has a layer made of a material comprised of diamond, DLC (diamond-like carbon), titanium nitride (TiN), titanium carbonitride (TiCN), silicon carbonitride (SiCN), silicon carbide (SiC), silicon nitride (SiN), a super hard material, or an alloy thereof or a combination thereof on the surface of the aerosol generator 60 that is in contact with the particles, in order to reduce wear due to friction caused by contact with the particles. This layer can be formed by coating, plating, lining, or the like.

Figure 7:
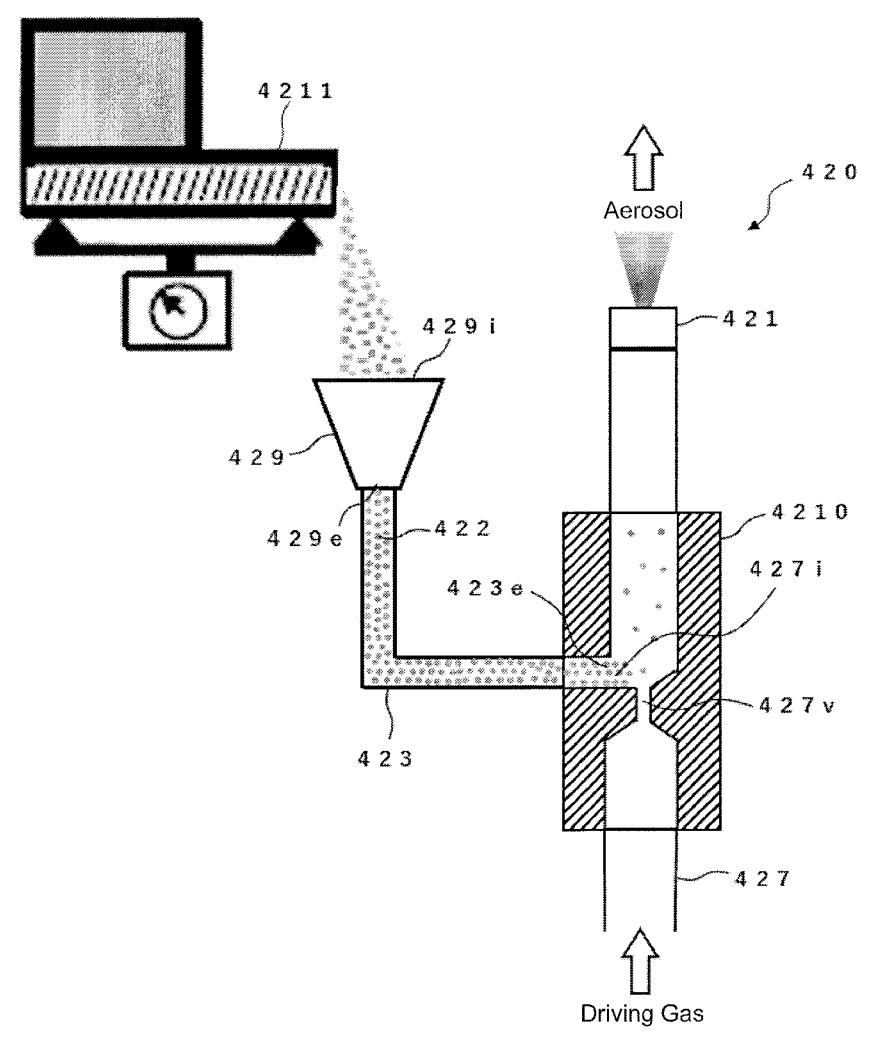

Here, a specific example of the aerosol generator 60 is shown in FIG. 7.

The aerosol generator 420 shown in FIG. 7 includes:
a drive gas flow path 427 for allowing a pressurized drive gas to flow;
a feed port 427*i* provided in the middle of the drive gas flow path 427 and capable of sucking particles (for example, ceramic particles 422) from the outer peripheral side of the drive gas flow path 427 to the interior of the drive gas flow path 427;
a nozzle 421 attached to the tip of the drive gas flow path 427 and capable of injecting aerosol;
a flow path 423 for sucking and carrying the ceramic particles 422, the flow path 423 having an outlet 423*e* that is in communication with the feed port 427*i*; and
a housing portion for housing the ceramic particles 422 and feeding the ceramic particles 422 to the flow path 423 for sucking and carrying.

For the housing portion 429, a funnel can be used, for example. The housing portion 429 houses the ceramic particles 422 adjusted to a predetermined particle size distribution. The ceramic particles 422 housed in the housing portion 429 is carried from an outlet 429*e* provided at the bottom of the housing portion 429 to an outlet 423*e* through the flow path 423 by the suction force from the driving gas flow path 427, and then introduced into the drive gas flow path 427 through the feed port 427*i*. In this case, the ambient gas (typically air) sucked from the inlet 429*i* of the housing portion is also introduced into the drive gas flow path 427 through the flow path 423 together with the ceramic particles 422. The outlet 423*e* and the feed port 427*i* are common to each other. Further, the ceramic particles 422 are introduced into the drive gas flow path 427 from a direction substantially perpendicular to the flow direction of the drive gas flowing through the drive gas flow path 427.

The ceramic particles 422 fed into the drive gas flow path 427 collide with the drive gas flowing through the drive gas flow path 427, and are mixed while being crushed to form an aerosol which is injected through the nozzle 421. The nozzle 421 is preferably arranged at a position and in a direction where the aerosol is injected in a direction perpendicular to the bottom surface on the inlet side of the pillar shaped honeycomb structure. More preferably, the nozzle 421 is arranged at a position and in a direction where the aerosol is injected in a direction perpendicular to the bottom surface on the inlet side toward the central portion of the bottom surface on the inlet side.

The feeding of the ceramic particles 422 to the housing portion 429 may preferably be carried out using, for example, a powder metering feeder 4211 such as a screw feeder and a belt conveyor, although not limited thereto. The ceramic particles 422 discharged from the powder metering feeder 4211 can be dropped into the housing portion 429 by gravity.

In a preferred embodiment, the middle of the drive gas flow path 427 has a venturi portion 427*v* in which the flow path is narrowed, and the drive gas flow path 427 is provided with a feed port 427*i* on the downstream side of the most narrowed flow path of the venturi portion 427*v*. When the drive gas flow path 427 has the venturi portion 427*v*, the velocity of the drive gas passing through the venturi portion 427*v* is increased, so that a faster drive gas can be allow to collide against the ceramic particles 422 fed downstream of the venturi portion 427*v*, which will improve the crushing force. In order to increase the crushing force of the driving gas, the feed port 427*i* is preferably provided on the downstream side of the most narrowed portion of the venturi portion 427*v* and adjacent to that portion. This structure can be achieved, for example, by connecting the drive gas flow path 427 to the flow path 423 for sucking and carrying using a venturi ejector 4210.

The lower limit of the flow rate of the driving gas immediately before passing through the venturi portion 427*v* is preferably 13 m/s or more, and more preferably 20 m/s or more, and even more preferably 26 m/s or more, in terms of increasing the crushing force of the ceramic particles. The upper limit of the flow rate of the driving gas immediately before passing through the venturi portion 427*v* is not particularly set, but it may generally be 50 m/s or less, and typically 40 m/s or less.

The lower limit of a ratio of a flow path cross-sectional area immediately before the venturi portion 427*v* to a flow path cross-sectional area of the venturi portion 427*v* is preferably 8 or more, and more preferably 16 or more, in terms of increasing the crushing force. The upper limit of the ratio of the flow path cross-sectional area immediately before the venturi portion 427*v* to the flow path cross-sectional area of the venturi portion 427*v* is not particularly limited, but if it is too large, the pressure loss of the venturi portion 427*v* will be increased, and so it may preferably be 64 or less, and more preferably 32 or less. As used herein, the flow path cross-sectional area of the venturi portion 427*v* means a flow path cross-sectional area in the narrowest portion of the flow path in the venturi portion 427*v*. Further, the flow path cross-sectional area immediately before the venturi portion 427*v* means the flow path cross-sectional area immediately before the flow path becomes narrow on the upstream side of the venturi portion 427*v*.

The use of the venturi ejector 4210 can allow a larger suction force to be applied to the flow path 423 for sucking and carrying, for example when the driving gas is passed through the driving gas flow path 427, thereby preventing the flow path 423 from being clogged by the ceramic particles 422. The venturi ejector 4210 is also effective as a means for removing the ceramic particles 422 when the flow path 423 for sucking and carrying is clogged by the ceramic particles 422.

By using a compressed gas such as compressed air with adjusted pressure as the driving gas, the injection flow rate of the aerosol from the nozzle 421 can be controlled. As the driving gas, dry air (which has, for example, a dew point of 10° C. or less) is preferably used in order to suppress the aggregation of the ceramic particles.

The fine ceramic particles 422 have a property of being easily aggregated. However, the use of the aerosol generator 420 according to the present embodiment can inject the ceramic particles 422 having the target particle size distribution by which aggregation is suppressed.

Figure 8:
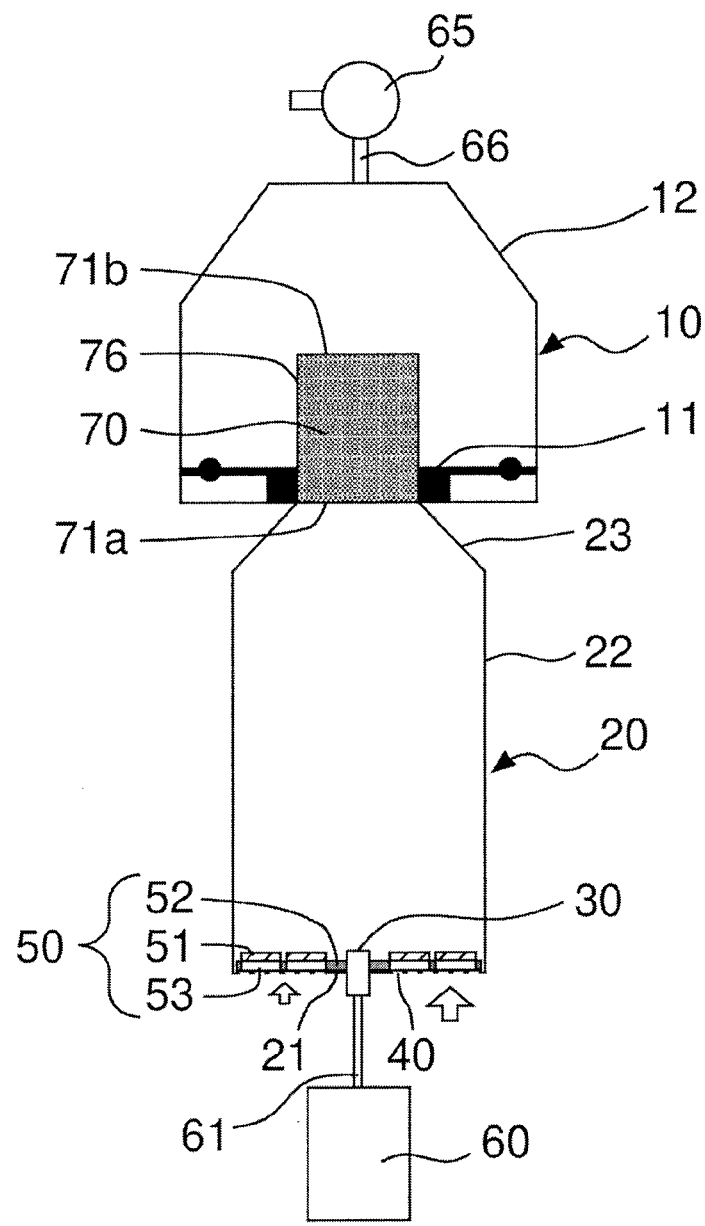
FIG. 8 is a schematic view of another particle adhesion device according to an embodiment of the present invention.

As shown in FIG. 8, the particle adhesion device 100 according to the embodiment of the present invention may further include a blower 65 for applying an attractive force to the second end face 71*b* of the filter substrate 70. The blower 65 can be connected to the holder 10 via the exhaust pipe 66. The use of the blower 65 can allow the flow rate of the ambient gas flowing into the chamber 20 to be adjusted depending on the suction force from the blower 65.

The blower 65 is a device having an exhaust function. The type of the blower 65 is not particularly limited, and any blower known in the art can be used.

A flow meter (not shown) may be arranged in the exhaust pipe 66 to monitor the gas flow rate measured by the flow meter and control the strength of the blower 65 depending on the gas flow rate.

(2) Method for Producing Filter

The method for producing a filter according to an embodiment of the present invention is carried out using the particle adhesion device 100. Since the particle adhesion device 100 can control the flow of the ambient gas by the flow control member 50 to generate the swirling flow in the fluid in the chamber 20, it can promote the diffusion of particles in the fluid (aerosol) in the chamber 20. Therefore, the use of the particle adhesion device 100 can allow a filter having a collection layer having a uniform thickness to be produced.

In one embodiment, the method for producing the filter according to the embodiment of the present invention includes: a step of holding the filter substrate 70 in the holder 10 (hereinafter referred to as a "holding step"); and a step of injecting the aerosol through the nozzle 30 toward the first end face 71a of the filter substrate 70 while controlling the flow of the ambient gas incorporated from the intake port 40 provided on the opposite surface 21 of the chamber 20 by the flow control member 50, thereby allowing the particles to adhere to the filter substrate 70 (hereinafter referred to as a "particle adhesion step"). By carrying out such a step, the particle adhesion device 100 can be appropriately controlled, so that a filter having a collecting layer having a uniform thickness can be produced.

In the holding step, the first end face 71a of the filter substrate 70 is arranged and held so as to face the space in the chamber 20. The holding method may be appropriately set depending on the type of the holder 10 and is not particularly limited.

In the particle adhesion step, the flow of the ambient gas can be controlled by the flow control member 50 to generate the swirling flow in the fluid in the chamber 20. Therefore, when the aerosol is injected through the nozzle 30 toward the first end face 71a of the filter substrate 70, the diffusion of particles can be promoted by the swirling flow of the ambient gas. Accordingly, the particles can be uniformly dispersed in the aerosol mixed with the ambient gas before arriving at the first end face 71a of the filter substrate 70. As a result, the particles can be uniformly fed to the entire first end face 71a of the filter substrate 70 facing the space in the chamber 20, thereby forming a collection layer having a uniform thickness. For example, when the filter substrate 70 is the pillar shaped honeycomb substrate 72, the particles are sucked into the first cells 74 opened on the first end face 71a, and the particles sucked into the first cells 74 adheres to the surfaces of the first cells 74 to form the collection layer.

From the viewpoint of improving film thickness stability of the particles adhering to the surfaces of the first cells 74, an average flow rate of the aerosol flowing in the chamber 20 is preferably 0.5 m/s to 3.0 m/s, and more preferably 1.0 m/s to 2.0 m/s, in the particle adhesion step.

From the viewpoint of improving the film thickness stability of the particles adhering to the surface of the first cells 74, the lower limit of the average flow rate of the aerosol flowing in the pillar shaped honeycomb substrate 72 in the particle adhesion step is preferably 0.5 m/s or more, and more preferably 1 m/s or more. Further, in order to maintain the high porosity of the porous partition wall 77, the upper limit of the average flow rate of the aerosol flowing in the pillar shaped honeycomb substrate 72 is preferably 20 m/s or less, and preferably 15 m/s or less.

When the particle adhesion step is continued, the pressure loss between the first end face 71a and the second end face 71b of the filter substrate 70 is increased as the adhesion amount of particles is increased. Therefore, by obtaining the relationship between the adhesion amount of particles and the pressure loss in advance, the end point of the particle adhesion step can be determined based on the pressure loss. Therefore, in the particle adhesion device 100, a differential pressure gauge may be arranged to measure the pressure loss between the first end face 71a and the second end face 71b of the filter substrate 70, and the end point of the particle adhesion step may be determined based on the value of the differential pressure gauge.

When the filter substrate 70 is the pillar shaped honeycomb substrate 72, the particles adhere to the first end face 71a of the pillar shaped honeycomb substrate 72 by carrying out the particle adhesion step. Therefore, the particles are preferably sucked and removed by means of vacuum or the like while leveling the first end face 71a using a jig such as a scraper.

The particles contained in the aerosol are not particularly limited, but they are preferably ceramic particles.

The ceramic particles that can be used herein include the above-mentioned ceramic particles forming the porous partition walls 77. For example, the ceramic particles that can be used herein include ceramic particles containing one or more selected from cordierite, silicon carbide (SiC), talc, mica, mullite, potsherd, aluminum titanate, alumina, silicon nitride, sialon, zirconium phosphate, zirconia, titania and silica. A main component of the ceramic particles is preferably silicon carbide, alumina, silica, cordierite or mullite. The main component of the ceramic particles refers to a component of which 50% by mass or more of the ceramic particles is comprised. The ceramic particles preferably contain 50% by mass or more, and more preferably 70% by mass or more, and even more preferably 90% by mass or more, of SiC.

After the particle adhesion step, a filter is completed by a heat treatment under conditions where the filter substrate 70 to which the particles have been allowed to adhere is held at a maximum temperature of 1000° C. or more for 1 hour or longer, for example, for 1 hour to 6 hours, and typically at a maximum temperature of 1100° C. to 1400° C. for 1 hour to 6 hours. The heat treatment can be carried out, for example, by placing the filter substrate 70 to which the particles have been allowed to adhere in an electric furnace or a gas furnace. By the heat treatment, the particles are bonded to each other and the particles are seized on the filter substrate 70 to form the collection layer. When the heat treatment is carried out under oxygen-containing conditions such as air, an oxide film is formed on the surface of the particles and the bonding between the particles is promoted. As a result, the collection layer that is difficult to peel off from the filter substrate 70 can be obtained.

(3) Pillar Shaped Honeycomb Structure Filter

Figure 9:
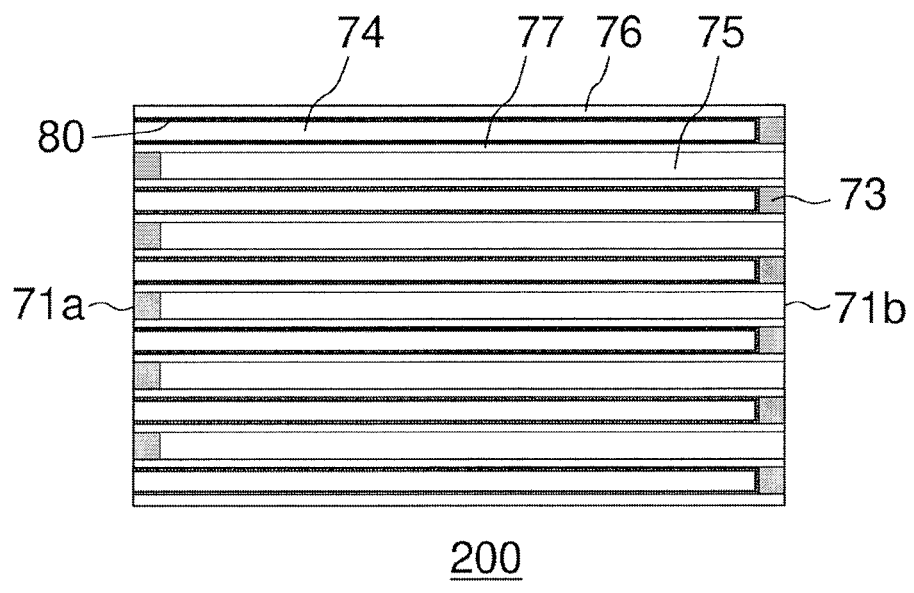
FIG. 9 is a schematic cross-sectional view of a pillar shaped honeycomb structure filter according to an embodiment of the present invention.

FIG. 9 is a schematic cross-sectional view (cross-sectional view parallel to the extending direction of the cells) of the pillar shaped honeycomb structure filter according to an embodiment of the present invention. Further, FIG. 10 is a schematic end view (end view of the first end face) of the pillar shaped honeycomb structure filter.

Figure 10:
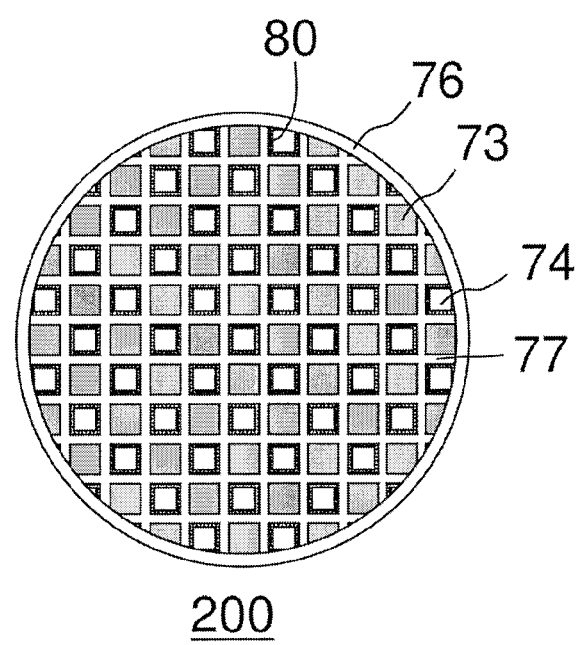
FIG. 10 is a schematic end view of the pillar shaped honeycomb structure filter of FIG. 9.

As shown in FIGS. 9 and 10, a pillar shaped honeycomb structure filter 200 according to an embodiment of the present invention includes: a pillar shaped honeycomb substrate 72 having: a plurality of first cells 74 each extending from a first end face 71a to a second end face 71b, the first end face 71a being opened and the second end face 71b having plugged portions 73; and a plurality of second cells each extending from the first end face 71a to the second end face 71b, the second end face 71b being opened and the first end face 71a having the plugged portions 73, wherein each of the first cells 74 and each of the second cells 75 are alternately arranged to be adjacent to each other across a porous partition wall 77; and a collection layer 80 formed on the surfaces of the first cells 74. It should be noted that although FIGS. 9 and 10 show an example in which the collection layer 80 is formed on the surfaces of the first cells 74, the collection layer 80 may be formed on the surfaces of the second cells 75, or both surfaces of the first cells 74 and the first cells 75.

The pillar shaped honeycomb structure filter 200 according to the embodiment of the present invention has a difference between thicknesses of the collection layer 80 of 15 μm or less, and preferably 13 μm or less. If the difference is within this range, it can be said that the collection layer 80 has a uniform thickness, so that the collection effect of the particulate matters (PMs) can be improved.

The thickness of the collection layer 80 tends to differ, particularly between the central portion and the outer peripheral portion in the cross section of the pillar shaped honeycomb structure filter 200 orthogonal to the extending direction of the first cells 74 and the second cells 75. Therefore, it is preferable to calculate the difference between thicknesses of the collection layer 80 by obtaining the difference between the thicknesses of the central portion and the outer peripheral portion in the cross section. As used herein, the central portion means a portion of the cross section at a distance up to $\frac{1}{3}$ from the center to the diameter (a distance from the center to the outer circumference), and the outer peripheral portion means a portion at a distance up to $\frac{1}{3}$ from the outer circumference to the diameter.

The thickness of the collection layer 80 can be measured using a three-dimensional measuring machine (model VR-3200 or VR-5200) from KEYENCE CORPORATION. The measurement may be carried out at a position of 25 mm in the direction of the cells (first cells 74 and second cells 75) extending from the end faces (first end face 71a, and second end face 71b).

In the pillar shaped honeycomb structure filter 200 according to an embodiment of the present invention, as an exhaust gas containing particulate matters (PMs) such as soot is fed to the first end face 71a of the pillar shaped honeycomb structure filter 200, the exhaust gas is introduced into the first cells 74 to proceed toward the downstream in the first cells 74. Since the first cells 74 have the plugged portions 73 on the second end face 71b on the downstream side, the exhaust gas penetrates the porous partition walls 77 on which the collecting layer 80 is formed and which define the first cells 74 and the second cells 75, to flow in the second cells 75. Since the particulate matters cannot pass through the porous partition walls 77 on which the collection layer 80 has been formed, the particulate matters are collected and deposited in the first cells 74. After the particulate matters are removed, the clean exhaust gas flowing in the second cells 75 proceeds toward the downstream in the second cells 75 and flows out from the second end face 71b on the downstream side.

The pillar shaped honeycomb structure filter 200 according to the embodiment of the present invention preferably has a diameter of 180 mm or more in a cross section orthogonal to the extending direction of the first cells 74 and the second cells 75. While the conventional particle adhesion device is difficult to form the collecting layer 80 having the uniform thickness on the pillar shaped honeycomb substrate 72 having the diameter of 180 mm or more, the particle adhesion device 100 according to the embodiment of the present invention can form the collection layer 80 having the uniform thickness even on the pillar shaped honeycomb substrate 72 having the diameter of 180 mm or more.

The pillar shaped honeycomb structure filter 200 according to the embodiment of the present invention can be produced using the pillar shaped honeycomb substrate 72 as the filter substrate 70, according to the method for producing the filter as described above.

EXAMPLES

Hereinafter, the present invention will be described in more detail with reference to Examples, but the present invention is not limited to these Examples.

(A) Production of Pillar Shaped Honeycomb Substrate

To 100 parts by mass of cordierite-forming raw material were added 3 parts by mass of pore former, 55 parts by mass of dispersion medium, 6 parts by mass of organic binder, and 1 part by mass of dispersant, mixed and kneaded to prepare a green body. Alumina, aluminum hydroxide, kaolin, talc and silica were used as the cordierite-forming raw material. Water was used as the dispersion medium, a water-absorbent polymer was used as the pore former, hydroxypropylmethyl cellulose was used as the organic binder, and fatty acid soap was used as the dispersant.

The green body was introduced into an extrusion molding machine and extruded through a die having a predetermined shape to obtain a cylindrical honeycomb formed body. The resulting honeycomb formed body was subjected to dielectric drying and hot air drying, and both end faces were then cut so as to have predetermined dimensions to obtain a honeycomb dried body.

The resulting dried honeycomb was plugged using cordierite as a material so that each of the first cells and each of the second cells were alternately arranged to be adjacent to each other, and then degreased by heating in an air atmosphere at about 200° C., and further fired in an air atmosphere at 1420° C. for 5 hours to obtain a pillar shaped honeycomb substrate.

The specifications of the pillar shaped honeycomb substrate are as follows:
Overall shape: cylindrical shape having a diameter 270 mm×a height of 300 mm;
Cell shape in cross section orthogonal to extending direction of cells: square;
Cell density (number of cells per unit cross section): 200 cells/square inch (31.1 cells/cm$^2$); and
Thickness of porous partition wall: 0.2 mm (nominal value based on die specifications).

(B) Production of Pillar Shaped Honeycomb Structure Filter

Using the particle adhesion device having the structure as shown in FIG. 8, ceramic particles were allowed to adhere to the surfaces of the first cells of the pillar shaped honeycomb substrate as described above, by injecting an aerosol containing the ceramic particles through the nozzle toward the first end face of the pillar shaped honeycomb substrate while controlling the flow of the ambient gas incorporated from the intake port provided on the opposite surface of the chamber by the flow control member.

Figure 4:
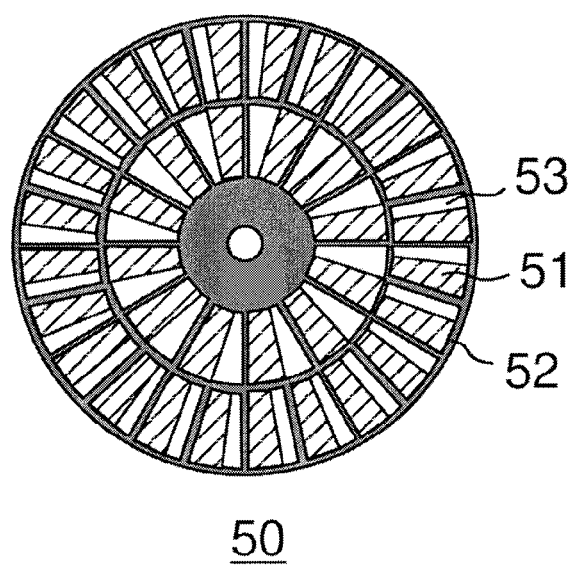
FIG. 4 is a schematic top view of a member having a plurality of blades.
Figure 5:
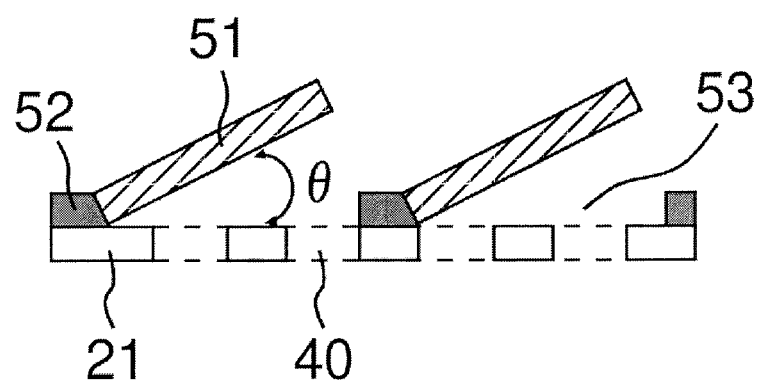
FIG. 5 is a schematic enlarged cross-sectional view of the member of FIG. 4 in a circumferential direction.
Figure 6:
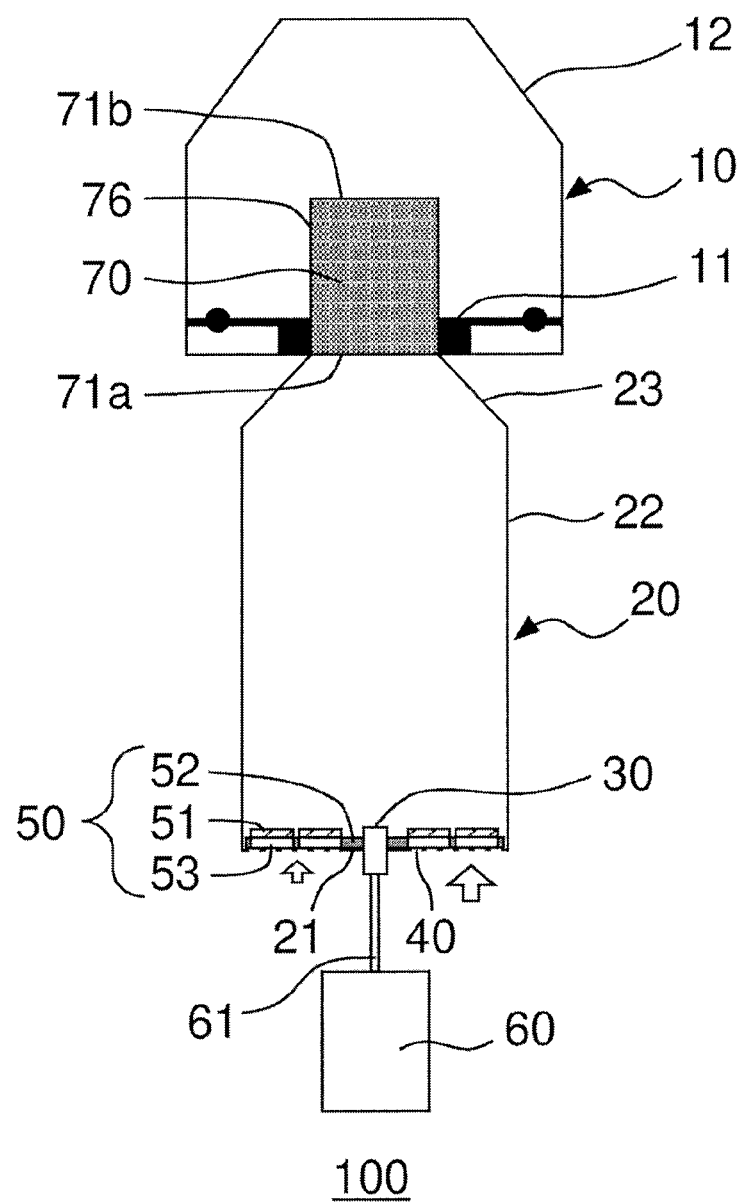
FIG. 6 is a schematic view of another particle adhesion device according to an embodiment of the present invention.

The specifications and operating conditions of the particle adhesion device are as follows:
<Flow Control Member>
Structure: the flow control member having the structure as shown in FIG. 4 (two rows of blades were provided in the radial direction from the central portion to the outer circumference of the opposite surface);

Inclination angle θ of blade with respect to opposite surface: 15 to 60° (specific inclination angle θ in each Example is shown in Table 1; in Comparative Example 1, the flow control member was not used).

<Chamber>
Shape: cylindrical shape;
Inner diameter: 300 mm;
Length: 850 mm;
Ambient gas: air;
Structure of opposite surface: punching plate;
Installation of filter at intake port: Yes;
Nozzle position: central portion of opposite surface; and
Distance from outlet of nozzle to first end face of pillar shaped honeycomb substrate: 850 mm.

<Aerosol Generator>
Product name: none (manufactured in-house) (which has the structure as shown in FIG. 7);
Type: continuous aerosol generator;
Means for connecting drive gas flow path to flow path for sucking and carrying: venturi ejector;
Installed position of feed port for ceramic particles: the position on the downstream side of the venturi portion where the flow path was most narrowed and adjacent to that position;
Means for feeding ceramic particles to housing portion: screw feeder;
Type of housing portion: funnel;
Type of ceramic particles to be housed in housing portion: SiC particles;
Particle size distribution of ceramic particles on volume basis (measured by laser diffraction/scattering method): median diameter (D50)=3 μm, SiC particles with particle diameter of 10 μm or more: ≤20% by volume;
Driving gas: compressed dry air (dew point of 10° C. or less);
Ambient gas to be sucked: air;
Average flow rate of ambient gas flowing through flow path for sucking and carrying: 40 L/min:
Average flow rate of drive gas flowing through drive gas flow path before merging with sucked ambient gas: 80 L/min;
Ratio of flow path cross-sectional area immediately before venturi portion to flow path cross-sectional area of venturi portion=1:0.028;
Average flow rate of aerosol injected from nozzle: 26 m/s (measured at a position of 10 to 20 mm on downstream side from nozzle by ANEMOMASTER [KANOMAX, model: 6162]);
Average flow rate of aerosol injected from nozzle: 120 L/min (measured by a flow meter); and
Mass flow rate of ceramic particles in aerosol injected from nozzle: 0.5 g/s (measured by a flow meter).

<Operating Conditions>
Suction flow rate of blower: 4000 L/min;
Average flow rate of aerosol flowing in pillar shaped honeycomb substrate: about 10 m/s (calculated by flow rate/cell opening area); and
End point of ceramic particle adhesion step: at the time when the value of the differential pressure gauge arrived at +0.1 kPa to +0.4 kPa (the differential pressure value is different because the mass of the film set by the product volume is different).

Next, the ceramic particles adhering to the first end face were sucked and removed by vacuum while leveling the first end face of the pillar shaped honeycomb substrate to which the ceramic particles thus obtained adhered using a scraper. The pillar shaped honeycomb substrate was then placed in an electric furnace and heat-treated in an air atmosphere under the condition of holding at a maximum temperature of 1200° C. for 2 hours to form a pillar shaped honeycomb structure filter in which the collecting layer was formed on the surfaces of the first cells.

For the pillar shaped honeycomb structure filter obtained above, the thicknesses of the central portion and the outer peripheral portion were determined at a position of 25 mm in the direction of the first cells extending from the first end face, using a three-dimensional measuring machine (model VR-3200 or VR-5200) from KEYENCE CORPORATION.

Further, in the production of the above pillar shaped honeycomb structure filter, a loss of the raw material in the adhesion step of the ceramic particles was calculated. The loss of the raw material was calculated by subtracting the amount of ceramic particles adhering to the pillar shaped honeycomb substrate from the feed amount of ceramic particles used for forming the collection layer. The feed amount of the ceramic particles used for forming the collection layer was the feed amount of the ceramic particles for the screw feeder. The amount of ceramic particles adhering to the pillar shaped honeycomb substrate was calculated from a difference between the masses of the pillar shaped honeycomb substrate before and after the formation of the collection layer.

Table 1 shows the evaluation results as described above.

TABLE 1

| | Inclination Angle θ of Blade [°] | Thickness of Collection Layer [μm] | | | Loss of Raw Material [G] |
| --- | --- | --- | --- | --- | --- |
| | | Central Portion | Outer Peripheral Portion | Difference | |
| Example 1 | 15 | 30 | 25 | 5 | 12 |
| Example 2 | 30 | 30 | 23 | 7 | 10 |
| Example 3 | 45 | 30 | 22 | 8 | 8 |
| Example 4 | 60 | 30 | 18 | 12 | 6 |
| Comp. 1 | — | 30 | 12 | 18 | 1 |

As shown in Table 1, the collection layer formed using the particle adhesion device that was not provided with the flow control member had a larger difference between thicknesses of the central portion and the outer peripheral portion (Comparative Example 1), whereas the collection layer formed using the particle adhesion device provided with the flow control member had a smaller difference between thicknesses of the central portion and the outer peripheral portion (Examples 1 to 4). Further, as the inclination angle α of the blade of the flow control member became smaller, the ceramic particles tended to adhere to the blades, so that the loss of the raw material tended to increase.

As can be seen from the above results, according to the present invention, it is possible to provide a particle adhesion device and a method for producing a filter, which can form a collection layer having a uniform thickness regardless of the type and size of the filter substrate. Also, according to the present invention, it is possible to provide a pillar shaped honeycomb structure filter including a collection layer having a uniform thickness.

DESCRIPTION OF REFERENCE NUMERALS 10 holder
20 chamber
21 opposite surface
22 side wall
23 tapered portion 30 nozzle
40 intake port
50 flow control member
51 blade
52 flat surface portion
53 opening
60 aerosol generator
61 connecting pipe
65 blower
66 exhaust pipe
70 filter substrate
71a first end face
71b second end face
72 pillar shaped honeycomb substrate
73 plugged portion
74 first cell
75 second cell
76 outer peripheral wall
77 porous partition wall
80 collection layer
100 particle adhesion device
200 pillar shaped honeycomb structure filter
420 aerosol generator
421 nozzle
422 ceramic particles
423 flow path
423e outlet
427 drive gas flow path
427i feed port
427v venturi portion
429 housing portion
429i inlet
429e outlet
4210 venturi ejector
4211 powder metering feeder

The invention claimed is:

1. A particle adhesion device, comprising:
a holder for holding a filter substrate, the filter substrate having a first end face in which a fluid can flow and a second end face from which the fluid can flow out;
a chamber in communication with the holder, the chamber being arranged so that the first end face of the filter substrate faces a space in the chamber;
a nozzle arranged on an opposite surface of the chamber opposing to the first end face of the filter substrate, the nozzle being capable of injecting an aerosol containing particles toward the first end face of the filter substrate;
an intake port provided on the opposite surface of the chamber, the intake port being capable of incorporating an ambient gas; and
a flow control member arranged on the opposite surface provided with the intake port, the flow control member being capable of controlling the flow of the ambient gas;
wherein the flow control member has a plurality of blades having an inclination angle of 10 to 80° with respect to the opposite surface;
wherein the flow control member further comprises: a flat surface portion parallel to the opposite surface; and a plurality of openings provided at the flat surface portion, each of the openings exposing at least a part of the intake port, and
wherein each of the blades is provided at a boundary between the flat plate portion and each of the openings and is inclined toward each of the openings.

2. The particle adhesion device according to claim 1, wherein each of the blades has substantially the same shape as an outer edge shape of each of the openings.

3. The particle adhesion device according to claim 1, wherein the blades are provided in two or more rows in a radial direction from a central portion to an outer peripheral portion of the opposite surface.

4. The particle adhesion device according to claim 1, wherein the nozzle is provided at the central portion of the opposite surface, and a plurality of intake ports are provided on the opposite surface around the nozzle.

5. The particle adhesion device according to claim 1, wherein the filter substrate is a pillar shaped honeycomb substrate comprising: a plurality of first cells each extending from a first end face to a second end face, the first end face being opened and the second end face having plugged portions; and a plurality of second cells each extending from the first end face to the second end face, the second end face being opened and the first end face having plugged portions, wherein each of the first cells and each of the second cells are arranged to be adjacent to each other across a porous partition wall.

6. The particle adhesion device according to claim 5, wherein the pillar shaped honeycomb substrate has a diameter of 180 mm or more in a cross section orthogonal to an extending direction of the first cells and the second cells.

7. The particle adhesion device according to claim 1, further comprising an aerosol generator connected to the nozzle.

8. The particle adhesion device according to claim 1, further comprising a blower for applying a suction force to the second end face of the filter substrate.

9. A method for producing a filter using the particle adhesion device according to claim 1.

10. The method for producing the filter according to claim 9, comprising:
a step of holding the filter substrate in the holder; and
a step of injecting the aerosol through the nozzle toward the first end face of the filter substrate while controlling the flow of the ambient gas incorporated from the intake port provided on the opposite surface of the chamber by the flow control member, thereby allowing the particles to adhere to the filter substrate.

11. The method for producing the filter according to claim 9, wherein the particles are ceramic particles.

12. The method for producing the filter according to claim 11, wherein a main component of the ceramic particles is silicon carbide, alumina, silica, cordierite or mullite.

* * * * *